US011064418B2

(12) United States Patent
Doherty et al.

(10) Patent No.: US 11,064,418 B2
(45) Date of Patent: Jul. 13, 2021

(54) TWO-HOP WIRELESS NETWORK COMMUNICATION

(71) Applicant: Analog Devices International Unlimited Company, Limerick (IE)

(72) Inventors: Lance Robert Doherty, Boston, MA (US); Jonathan Noah Simon, Castro Valley, CA (US); Aleksandr Lushin, Santa Clara, CA (US); Gina Aquilano, Somerville, MA (US)

(73) Assignee: Analog Devices International Unlimited Company, Limerick (IE)

( * ) Notice: Subject to any disclaimer, the term of this patent is extended or adjusted under 35 U.S.C. 154(b) by 16 days.

(21) Appl. No.: 16/564,894

(22) Filed: Sep. 9, 2019

(65) Prior Publication Data

US 2021/0076293 A1 Mar. 11, 2021

(51) Int. Cl.
*H04W 40/22* (2009.01)
*H04B 1/7156* (2011.01)
(Continued)

(52) U.S. Cl.
CPC .......... *H04W 40/22* (2013.01); *H04B 1/7156* (2013.01); *H04B 7/208* (2013.01);
(Continued)

(58) Field of Classification Search
CPC ..... H04W 40/22; H04W 84/18; H04W 88/04; H04B 1/7156; H04B 7/208; H04L 45/16
See application file for complete search history.

(56) References Cited

U.S. PATENT DOCUMENTS 6,990,080 B2 1/2006 Bahl et al.
7,505,450 B2 3/2009 Castagnoli
(Continued)

FOREIGN PATENT DOCUMENTS

CN 101355496 A 1/2009

OTHER PUBLICATIONS

Khoufi, Ines, et al., "Beacon Advertising in an IEEE 802.15.4e TSCH Network for Space Launch Vehicles", Acta Astronautica 158, (2019), 76-88.
(Continued)

*Primary Examiner* — Rasheed Gidado
(74) *Attorney, Agent, or Firm* — Schwegman Lundberg & Woessner, P.A.

(57) ABSTRACT

A system and method for providing multiple modes of communication in wireless networks includes a network manager and a plurality of network nodes. The plurality of network nodes form a wireless network with the network manager and are configured to communicate data to the network manager using respective communication links having a first bandwidth. The plurality of network nodes are further configured to transition to a two-hop mode of communication upon one or more failures in communication to the network manager. While in the two-hop mode of communication, a respective network node of the plurality of nodes is configured to transmit node data to at least one other network node over a communication link having a second bandwidth different than the first bandwidth. The other network nodes are configured to listen for communication from the respective network node and re-transmit to the network manager the node data received from the respective network node.

18 Claims, 7 Drawing Sheets

(51) Int. Cl.
*H04W 88/04* (2009.01)
*H04B 7/208* (2006.01)
*H04L 12/761* (2013.01)
*H04W 84/18* (2009.01)

(52) U.S. Cl.
CPC ............ *H04L 45/16* (2013.01); *H04W 84/18* (2013.01); *H04W 88/04* (2013.01)

(56) References Cited

U.S. PATENT DOCUMENTS

| | | | |
|---|---|---|---|
| 7,660,287 | B2 | 2/2010 | Axelsson et al. |
| 7,773,569 | B2 | 8/2010 | Belcea |
| 7,983,685 | B2 | 7/2011 | Silverstrim et al. |
| 8,385,322 | B2 | 2/2013 | Colling et al. |
| 8,811,413 | B2 * | 8/2014 | Bialkowski ............ H04L 49/10 370/401 |
| 9,014,213 | B2 | 4/2015 | Yeh et al. |
| 9,258,722 | B2 | 2/2016 | Schmidt et al. |
| 9,974,035 | B2 | 5/2018 | Prakash et al. |
| 10,117,267 | B2 * | 10/2018 | Raghu ............... H04W 72/1289 |
| 10,383,132 | B2 * | 8/2019 | Chung ............... H04W 72/085 |
| 10,484,947 | B2 * | 11/2019 | Nishibayashi .... H04W 52/0219 |
| 10,652,090 | B2 * | 5/2020 | Lee .......................... H04L 45/48 |
| 2010/0315989 | A1 * | 12/2010 | Reznik ................. H04L 1/1887 370/315 |
| 2012/0155273 | A1 * | 6/2012 | Hughes ............. G06F 15/17312 370/236 |
| 2014/0044036 | A1 * | 2/2014 | Kim .................. H04W 72/0446 370/315 |
| 2016/0345317 | A1 * | 11/2016 | Levesque ............ H04W 84/18 |
| 2019/0379497 | A1 * | 12/2019 | Aquilano ............ H04W 56/002 |

OTHER PUBLICATIONS

Kunitachi, Tadahide, et al., "Reliable Wireless Communications in Battery Management System of Electric Vehicles", 10th Intl. Conference on Mobile Computing and Ubiquitous Network (ICMU), (2017), 6 pgs.

Lee, Junhee, et al., "Multi-channel time division multiple access timeslot scheduling with link recovery for multi-hop wireless sensor networks", Intl. Journal of Distributed Networks, 13(8), (2017), 15 pgs.

Sudhakar, Deepak Vedha Raj, et al., "Effectiveness of Time-Slotted Channel Hopping in Wireless In-Vehicle Networks", Master Thesis for the Department of Mathematics and Computer Science, Eindhoven University of Technology, Netherlands, (2015), 77 pgs.

Zand, Pouria, et al., "D-MSR: A Distributed Network Management Scheme for Real-Time Monitoring and Process Control Applications in Wireless Industrial Automation", Sensors 13, (Jun. 27, 2013), 8239-8284.

* cited by examiner

FIG. 6A

| TIME | 0 | | | | | | | | | 10 | | | 20 | | | | | | | | 20 | | | | |
|---|---|---|---|---|---|---|---|---|---|---|---|---|---|---|---|---|---|---|---|---|---|---|---|---|---|
| SLOT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| MGR1 | DS | 1 | 2 | 3 | 4 | 5 | 6 | 7 | 8 | SO | SE | SO | SE | 1 | 2 | 3 | 4 | 5 | 6 | 7 | 8 | SE | SO | SE | AD |
| MGR2 | AD | 5 | 6 | 7 | 8 | 1 | 2 | 3 | 4 | SE | SO | SE | SO | 5 | 6 | 7 | 8 | 1 | 2 | 3 | 4 | SO | SE | SO | DS |
| 2HOP RX | | R8 | R7 | R6 | | | | | R5 | | | | | R4 | R3 | R2 | | | | | R1 | | | | |
| 2HOP TX | | | | | T1 | T2 | T3 | T4 | | | | | | | | | T5 | T6 | T7 | T8 | | | | | |

FIG. 6B

| TIME | 40 | | | | | | | | | | | | 60 | | | | | | | | | | | | 80 |
|---|---|---|---|---|---|---|---|---|---|---|---|---|---|---|---|---|---|---|---|---|---|---|---|---|---|
| SLOT | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| MGR1 | DS | 1 | 2 | 3 | 4 | 5 | 6 | 7 | 8 | SO | SE | SO | SE | 1 | 2 | 3 | 4 | 5 | 6 | 7 | 8 | SE | SO | SE | AD |
| MGR2 | AD | 5 | 6 | 7 | 8 | 1 | 2 | 3 | 4 | SE | SO | SE | SO | 5 | 6 | 7 | 8 | 1 | 2 | 3 | 4 | SO | SE | SO | DS |
| 2HOP RX | | | | | | | | | | | | | | | | | | | | | | | | | |
| 2HOP TX | | | | | | | | | | | | | | | | | | | | | | | | | |

FIG. 6C

| TIME | 80 | | | | | | | | | | | | | 100 |
|---|---|---|---|---|---|---|---|---|---|---|---|---|---|---|
| SLOT | 48 | 49 | 50 | 51 | 52 | 53 | 54 | 55 | 56 | 57 | 58 | 59 | 60 |
| MGR1 | DS | 1 | 2 | 3 | 4 | 5 | 6 | 7 | 8 | SO | SE | SO | SE |
| MGR2 | AD | 5 | 6 | 7 | 8 | 1 | 2 | 3 | 4 | SE | SO | SE | SO |
| 2HOP RX | | | | | | | | | | | | | |
| 2HOP TX | | | | | | | | | | | | | |

FIG. 7A

| TIME | 0 | | | | | | | | | | | 20 | | | | | | | | | | | | 40 |
|---|---|---|---|---|---|---|---|---|---|---|---|---|---|---|---|---|---|---|---|---|---|---|---|---|
| SLOT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| MGR1 | | | | 3 | | | | | | | | | | | | 3 | | | | | | | | | |
| MGR2 | | | | | | | | 3 | | SO | SO | SO | SO | | | | | | | 3 | | SO | SO | SO | |
| 2HOP TX | | | | | T1 | T2 | T3 | T4 | | | | | | | | | T5 | T6 | T7 | T8 | | | | | |

FIG. 7B

| TIME | 0 | | | | | | | | | | | 20 | | | | | | | | | | | | 40 |
|---|---|---|---|---|---|---|---|---|---|---|---|---|---|---|---|---|---|---|---|---|---|---|---|---|
| SLOT | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| MGR1 | DS | | | | | | | | | | | | | | | | | | | | | | | | AD |
| MGR2 | AD | | | | | | | | | | | | | | | | | | | | | | | | DS |
| 2HOP RX | R8 | R7 | R6 | | | | | R5 | | | | | | R4 | | R2 | | | | | R1 | | | | |

US 11,064,418 B2

TWO-HOP WIRELESS NETWORK COMMUNICATION

TECHNICAL FIELD

This document pertains generally, but not by way of limitation, to wireless networks, and particularly but not by way of limitation to two-hop communication in low power systems.

BACKGROUND

Wireless networks provide communication between nodes without the cost and complexity of routing cables. Wireless nodes can be distributed in remote or otherwise hard-to-reach locations. These nodes can include one more local power sources configured to provide power for the node, for example. To conserve power, low power communication schemes have been developed to limit power consumption due to data communication.

SUMMARY

In some scenarios, a wireless node can lose communication with a network manager, while still being capable of transmission to one or more neighboring nodes. During normal operation the wireless node transmits data to, and receives communication from, one or more network managers. In conventional systems, when the wireless node fails to reach the managers after a certain time period, the wireless node enters a search mode. The present inventors have realized, among other things, that activating links between the wireless node and neighboring nodes upon transmission failure of the wireless node to the network managers allows the system to continue operating despite the loss of communication.

In an example, a method of providing multiple modes of communication in wireless networks includes communicating data from a plurality of network nodes to a network manager using respective communication links having a first bandwidth, the plurality of network nodes and the network manager forming a wireless network; transitioning to a two-hop mode of communication for a respective network node of the plurality of nodes, wherein other respective network nodes amongst the plurality of network nodes are configured to listen for communication from the respective network node; transmitting node data from the respective network node to at least one of the other network nodes over a communication link having a second bandwidth different than the first bandwidth; and re-transmitting to the network manager, by the at least one of the other network nodes, the node data received from the respective network node.

In another example, a system for providing multiple modes of communication in wireless networks includes a network manager and a plurality of network nodes. The plurality of network nodes form a wireless network with the network manager and are configured to communicate data to the network manager using respective communication links having a first bandwidth. The plurality of network nodes are further configured to transition to a two-hop mode of communication upon one or more failures in communication to the network manager. While in the two-hop mode of communication, a respective network node of the plurality of nodes is configured to transmit node data to at least one other network node over a communication link having a second bandwidth different than the first bandwidth. The other network nodes are configured to listen for communication from the respective network node and re-transmit to the network manager the node data received from the respective network node.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 6A-6C are charts illustrating an example communication schedule that accommodate two-hop communication in a wireless network.

FIGS. 7A and 7B are charts illustrating an example communication schedule for an example wireless node that has entered a two-hop communication mode.

DETAILED DESCRIPTION

A wireless system is disclosed herein that provides a two-hop communication option for wireless nodes that lose communication with network managers. During normal system operation, wireless nodes may transmit data directly to network managers according to a communication schedule. A wireless node may lose a connection with the wireless managers due to mechanical failure, interference, or the like. Upon losing connection to the wireless managers, the respective wireless node can transition itself into a two-hop state. While in the two-hop state, the wireless node can attempt to transmit data to neighboring wireless nodes, while continuing to attempt to transmit data to the network managers. The neighboring nodes can relay the data received from the respective wireless node to the network managers, and can relay communications from the network managers to the respective wireless node.

Figure 1:
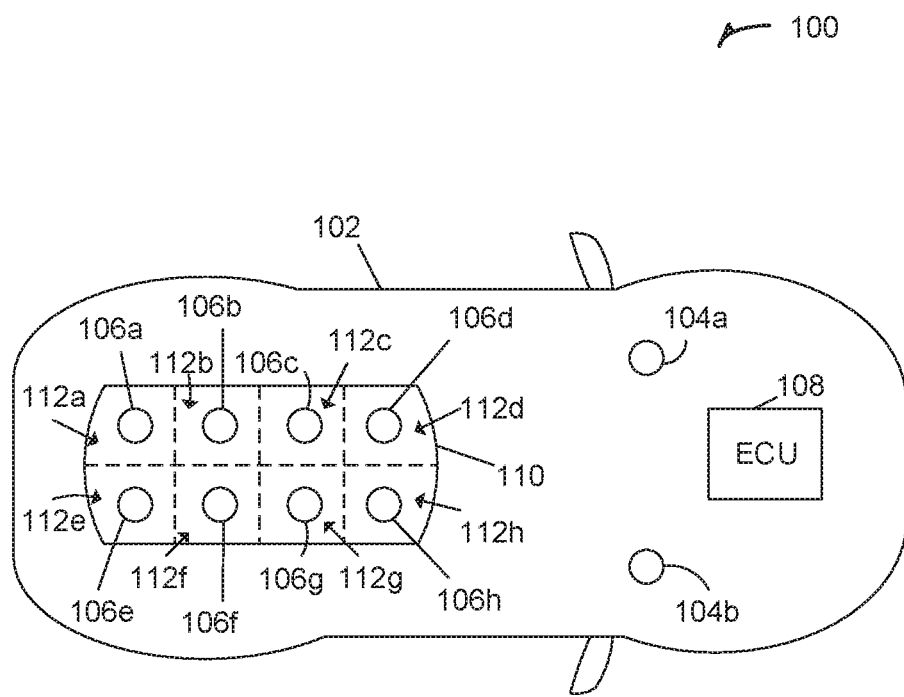
FIG. 1 is a diagram illustrating a wireless battery monitoring system for a vehicle.

FIG. 1 is a diagram illustrating a system 100 for a vehicle 102 that employs two-hop communication for wireless nodes when a wireless node is unable to transmit to a manager. The vehicle 102 may include network managers 104a and 104b, wireless nodes 106a-106h, an electronic control unit (ECU) 108, and a battery pack 110 that includes battery modules 112a-112h. Each battery module 112a-112h can include several battery cells. In one example, each module 112a-112h includes 12 battery cells. In other embodiments, each module 112a-112h can include any number of battery cells. While illustrated as a wireless battery monitoring system, the system 100 can be used for monitoring any component of a vehicle or other apparatus within which a low-power wireless system is desired.

The wireless nodes 106a-106h can be wireless sensors, for example, configured to sense operational characteristics of the battery cells of each of the battery modules 112a-112h, including, but not limited to, a voltage across or current through a respective battery module 1l2a-112h. The network managers 104a and 104b can collect the sensed data from the wireless nodes 106a-106h, for example, and provide the data to a host application running on the ECU 108 or other system through a wired or wireless connection. The host application can use the data to monitor the health of, and provide control for, the battery pack 110. The wireless nodes 106a-106h and network managers 104a and 104b can be configured using a mesh network topology, a star topology, a two-hop topology, or any other wireless network configuration.

In an example, the ECU 108 is configured to execute a host application for the battery monitoring system. While described in this example as hosted by the ECU 108, the host application can be executed by any other computing system. For example, the host application can be executed by one of the managers 104a and/or 104b. The ECU 108 can include, for example, software, hardware, and combinations of hardware and software configured to execute several functions related to control of the battery monitoring system. The ECU 108 can include controllers or processors such as any one or more of a microprocessor, a controller, a digital signal processor (DSP), an application specific integrated circuit (ASIC), a field-programmable gate array (FPGA), or equivalent discrete or integrated logic circuitry. The ECU 108 can also include storage devices, including short-term and/or long-term memory that can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

Figure 2:
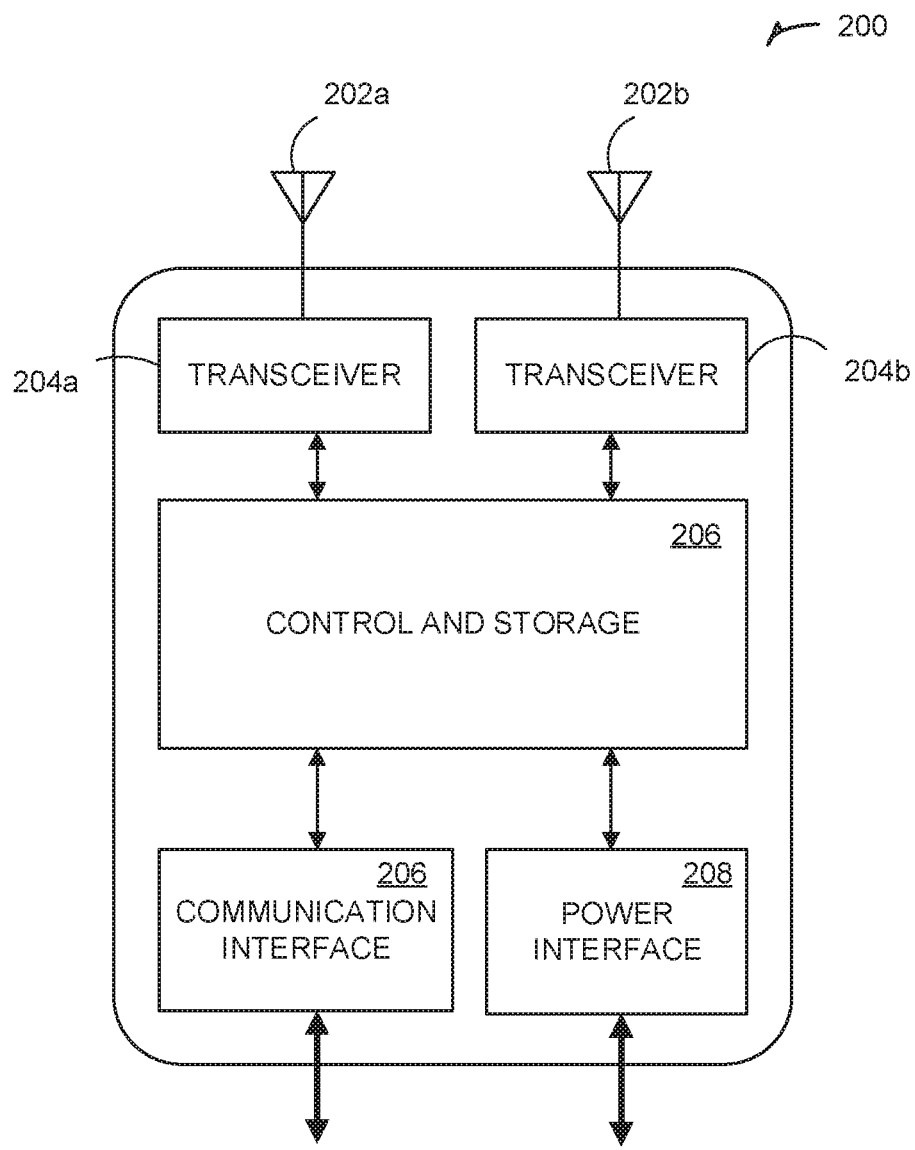
FIG. 2 is a block diagram illustrating an example network manager.

FIG. 2 is a block diagram illustrating an example network manager 200 of a wireless network. The network manager 200 can be implemented as either of the network managers 104a and 104b, or any other wireless node configured to transmit communication to, and receive communication from, another wireless node. In the example illustrated in FIG. 2, the network manager 200 includes antennas 202a and 202b, transceivers 204a and 204b, a control and memory circuit 206, a power interface 208, and a communication interface 210. In other examples, the network manager 200 can include more or fewer circuit elements in addition to, or in place of, the components illustrated in FIG. 2. For example, the network manager 200 may include a single antenna 202a and/or single transceiver 204a. In an example, the two transceivers 204a and 204b can be wideband transceivers that are agile across an entire frequency range over which the nodes will be communicating.

The control and memory circuit 206 can include one or more application-specific or general-purpose processor circuits. Such circuits can include system-on-chip (SoC) realization or such circuits can be field-programmable. As an illustrative example, the control and memory circuit 206 can include two controllers, one being a field programmable gate array (FPGA) and the other being a digital signal processor (DSP). The FPGA can be connected to control multi-channel communication using the two transceivers 204a and 204b, for example, and the DSP can be used for real-time processing such as downsampling, upsampling, coding, or decoding. In other examples, the control and memory circuit 206 can include any number of controllers including FPGAs, DSPs, microprocessors, application specific integrated circuits (ASICs) or other digital logic circuits.

The control and memory circuit 206 can include one or more volatile or non-volatile memories. For example, the control and memory circuit 206 can include one or more non-volatile memories including read-only memories (ROMs), flash memories, solid state drives, or any other non-volatile memory, and one or more volatile memories including, for example, static or dynamic random-access memories (RAM).

The power interface 208 can be configured to connect through a wired connection to receive power. For example, the power interface 208 may be connected to receive power from a vehicle power bus, such as a direct current (DC) bus and condition the power for use by the control and memory circuit 208. In some examples, the network manager device 200 can also include a backup power source such as a battery, capacitor, or energy harvester circuit. In some examples, the network manager device 200 may not be powered using a wired power connection and may be powered only using a local power source such as a battery or energy harvester. The communication interface 210 can be configured for wired communication with one or more of another network manager 200 and a backend system such as the ECU 108.

Figure 3:
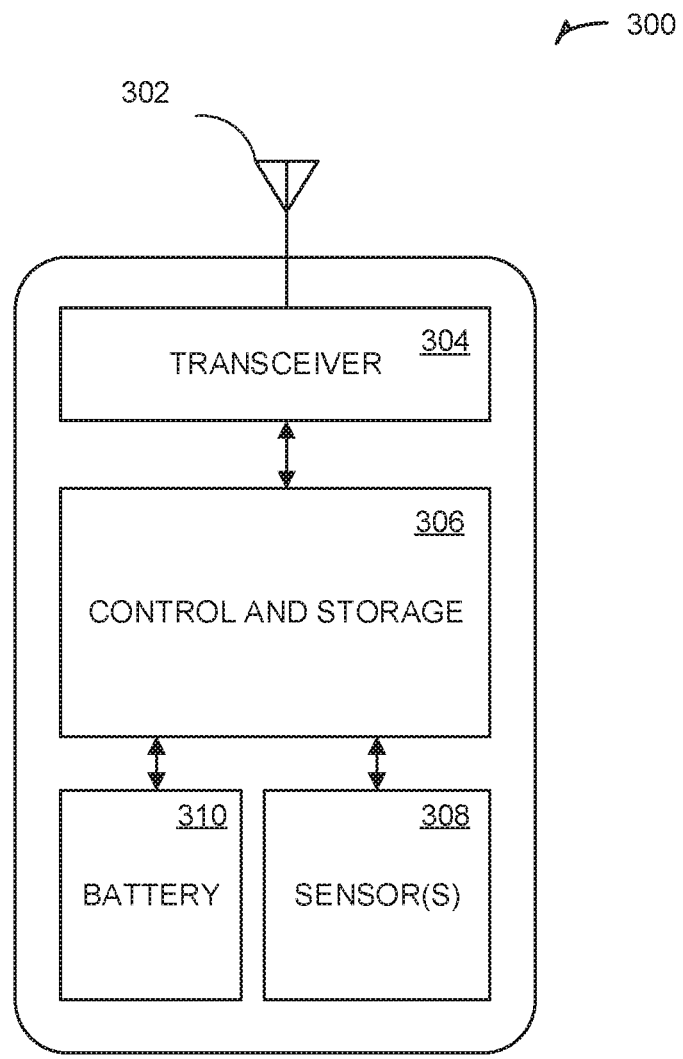
FIG. 3 is a block diagram illustrating an example wireless node.

FIG. 3 is a block diagram illustrating an example wireless node 300 of a wireless network. The wireless node 300 may be any of nodes 106a-106h of FIG. 1, or any other node in any other wireless network. In the example illustrated in FIG. 3, the wireless node 300 includes an antenna 302, a transceiver 304, a control and memory circuit 306, sensors 308, and a battery 310. In other examples, the wireless node 300 can include other circuit elements in addition to, or in place of, the components illustrated in FIG. 3. In an example, the antenna 302 and the transceiver 304 may be configured to transmit and receive communication using RF energy. The battery 310 can be a local battery, or any other energy memory device such as a capacitor or energy harvester. In some examples, the wireless node 300 may not be powered by local energy storage and may be powered using a wired power connection.

The control and memory circuit 306 can include one or more application-specific or general-purpose processor circuits. Such circuits can include system-on-chip (SoC) realization or such circuits can be field-programmable. The control and memory circuit 306 can also include one or more volatile or non-volatile memories. For example, the control and memory circuit 306 can include one or more non-volatile memories including read-only memories (ROMs), flash memories, solid state drives, or any other non-volatile memory, and one or more volatile memories including, for example, static or dynamic random-access memories (RAM).

Figure 4:
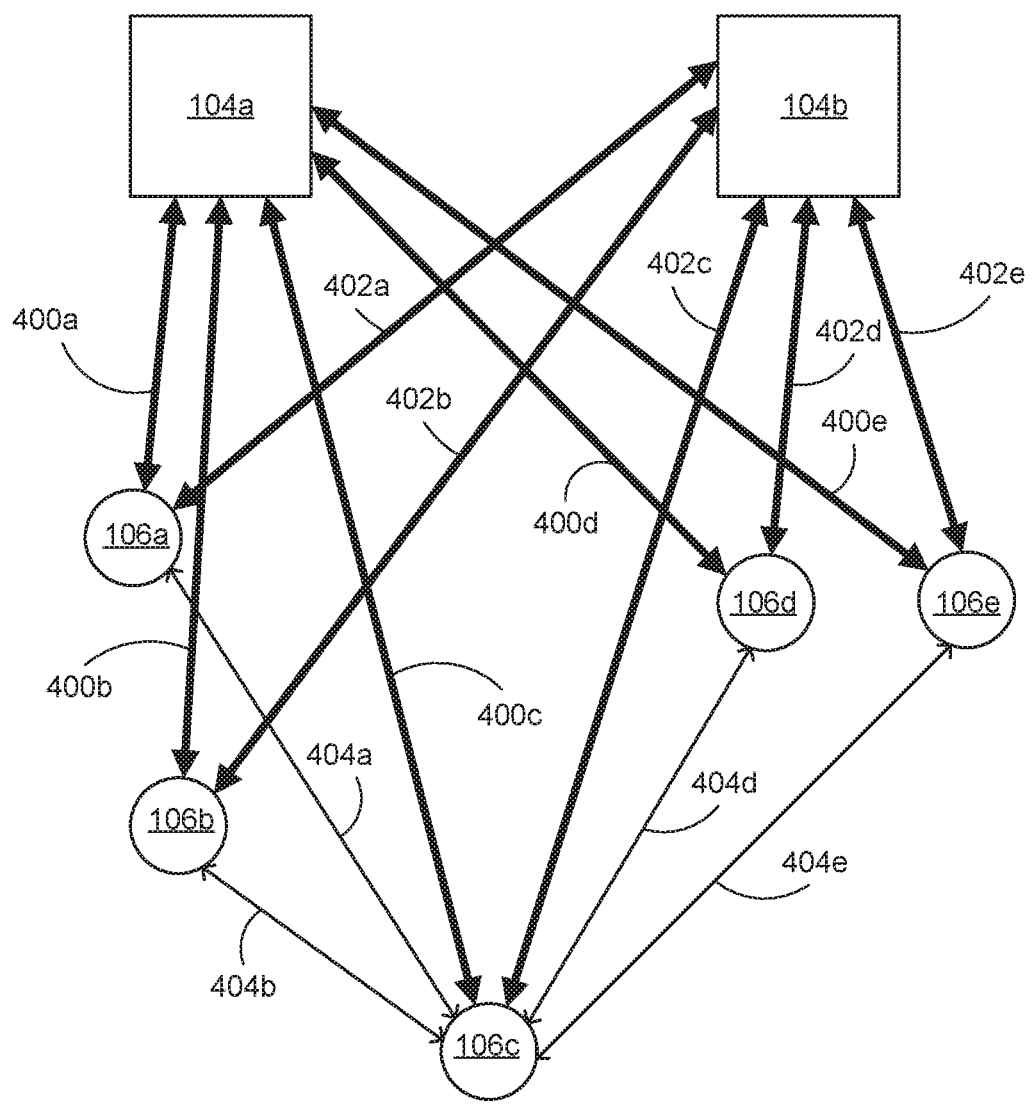
FIG. 4 is a diagram illustrating communication links in a wireless network.

FIG. 4 is a diagram illustrating communication links between wireless nodes 106a-106e and network managers 104a and 104b. Each wireless node 106a-106e is configured to communicate with the network manager 104a on respective high bandwidth paths 400a-400e, and with the network manager 104b on respective high bandwidth paths 402a-402e. Each high bandwidth path 400a-400e and 402a-402e may include a high bandwidth "upstream" path from the network nodes 106a-106e to the respective network managers 104a and 104b, and a high bandwidth "downstream" path from the network managers 104a and 104b to the respective network nodes 106a-106e. In addition to the high bandwidth paths, each network node 106a-106e is configured to communicate with each other network node 106a-106e on low bandwidth paths. FIG. 4 illustrates low bandwidth paths 404a-404e for the network node 106c. Each low bandwidth path 404a-404e can include an "upstream" path from the network node 106c to the other network nodes 106a, 106b, 106d, and 106e, and a "downstream" path from the other network nodes 106a, 106b, 106d, and 106e to the network node 106c. While illustrated only for the node 106c, each node 106a-106e may have low bandwidth communication paths to each other node 106a-106e.

During normal network operation, the wireless nodes 106a-106e may communicate with the network managers 104a and 104b using only the high bandwidth paths 400a-400e and 402a-402e. For example, the wireless nodes 106a-106e may collect data regarding a monitored component, such as a battery module, and provide the data to the network managers 104a and 104b over the respective high bandwidth paths 400a-400e and 402a-402e. This communication of data may be scheduled using a time synchronized channel hopping (TSCH) schedule or other network communication schedule. The high bandwidth paths 400a-400e and 402a-402e may be selected as a portion of the 2.4 GHz Industrial, Scientific, and Medical (ISM) band, for example.

During normal operation, an antenna of one of the wireless nodes may malfunction, providing the wireless node with decreased performance. For example, mechanical components and/or connection of the antenna may degrade or break, resulting in degraded performance of the antenna and a lower chance of successfully communicating with either network manager. In other examples, strong sources of radio-frequency (RF) interference may result in interruption of communication between one or more wireless nodes 106a-106e and the network managers 104a and 104b.

In some systems, such as the system 100, the wireless nodes 106a-106e may be physically closer to one another than to the network managers 104a and 104b. Thus, even with decreased performance, a respective wireless node 106a-106e may still be able to communicate with other wireless nodes 106a-106e using the low bandwidth paths 404a-404e. For the example illustrated in FIG. 4, if the wireless node 106c loses communication with the network managers 104a and 104b over the respective links 400c and 402c, the wireless node 106c can attempt to transmit data to the other wireless nodes 106a, 106b, 106d, and 106e using the links 404a-404e, such that one or more of the other wireless nodes 106a, 106b, 106d, and 106e may receive and forward the data from the wireless node 106c to the network managers 104a and 104b. The low bandwidth paths 404a-404e may be allocated on a separate band than the high bandwidth paths 400a-400e and 402a-402e so as not to cause any collisions between communications on the low bandwidth paths 404a-404e and the high bandwidth paths 400a-400e and 402a-402e. In one example, the total bandwidth of the paths 404a-404e may be equal to the bandwidth of the paths 400c and 402c.

While transmitting data to the other wireless nodes 106a, 106b, 106d, and 106e, the wireless node 106c may continue to attempt to transmit data to the network managers 104a and 104b over the communication links 400c and 402c. If the wireless node 106c is successful in transmitting data to the network managers 104a and 104b, the wireless node 106c may cease communicating data to the other wireless nodes 106a, 106b, 106d, and 106e and resume communicating data only to the network managers 104a and 104b.

The node 106c can also receive data from the network managers 104a and 104b through the wireless nodes 106a, 106b, 106d, and 106e over the downstream portion of the communication paths 404a-404e. In one example, the managers 104a and/or 104b can broadcast a communication intended for the wireless node 106c. The wireless managers 104a and 104b can indicate within the transmission that the communication is intended for the wireless node 106c. The broadcast can be sent over the downstream portions of the communication paths 400a-400e and 402a-402e. Each node 106a, 106b, 106d, and 106e may then attempt to forward the communication to the node 106c using the downstream portion of the respective communication paths 404a-404e. In another example, the network managers 104a and 104b may transmit communications intended for the node 106c directly to a respective node 106a, 106b, 106d, or 106e through which the network managers 104a and 104b received data from the node 106c. For example, if node 106a sent data to the network managers 104a and 104b for the node 106c, the network managers may then directly send communications intended for the node 106c to the node 106a for forwarding to the node 106c.

Figure 5:
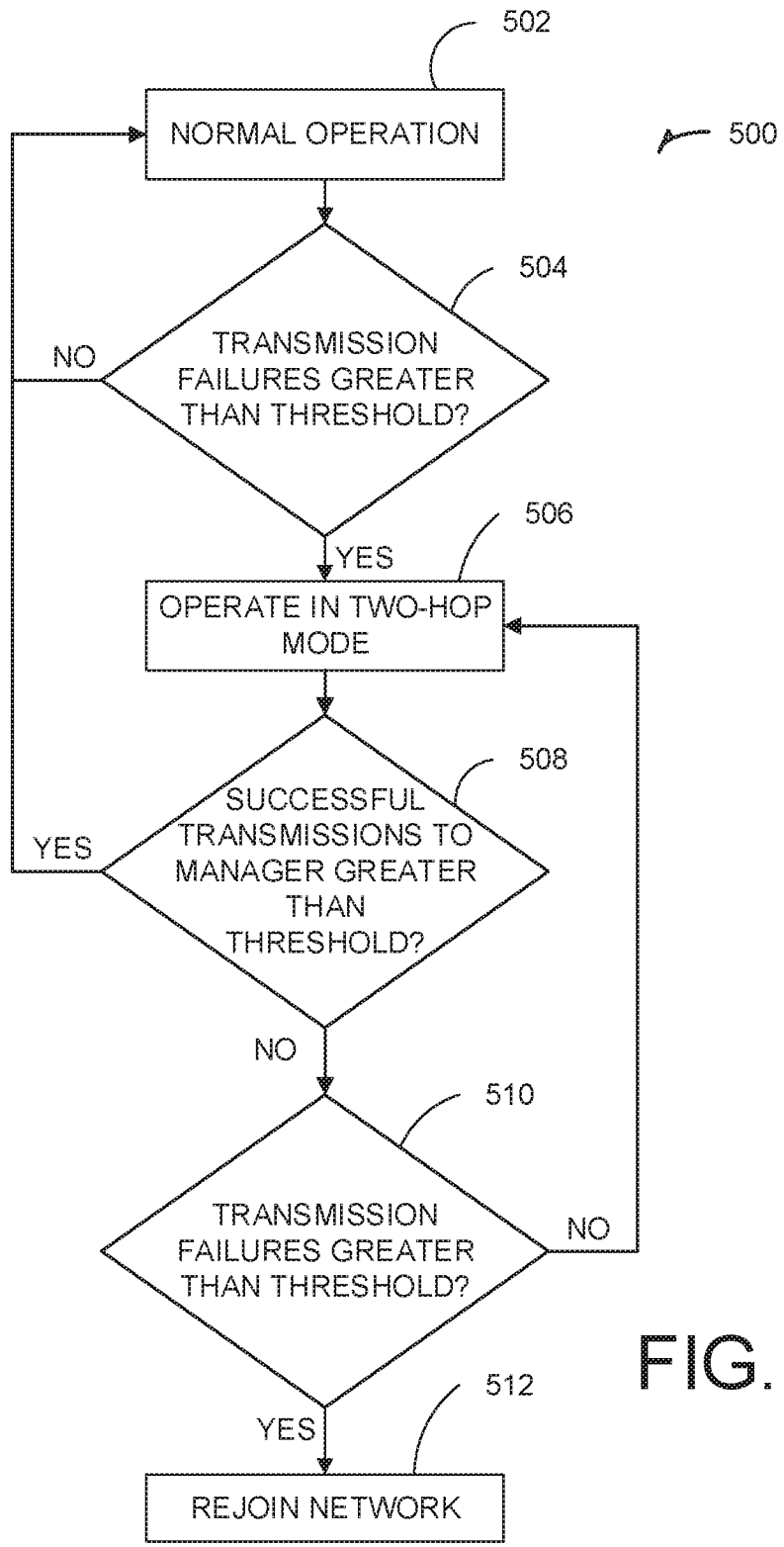
FIG. 5 is a flowchart illustrating an example method of communicating in a wireless network.

FIG. 5 is a flowchart illustrating a method 500 of wireless communication that includes a two-hop backup communication mode. At step 502, a wireless network communicates according to a specified communication schedule, such as the TSCH schedule illustrated in FIGS. 6A-6C, for example. During normal operation, each wireless node (such as the wireless nodes 106a-106h of FIG. 1) communicate using direct links with one or more network managers (such as the network managers 104a and 104b of FIG. 1). The direct links may utilize a high bandwidth paths as scheduled by the network schedule. As illustrated by step 504, the method 500 remains at step 502 until one of the network nodes experiences a threshold number of transmission failures.

The threshold number of failures at step 504 may be any number, such as 50 transmission failures, for example. This number may be selected based on the needs of the system. For example, in low-latency systems, it may be desirable to transition to a two-hop mode such that transmission latency requirements of the system are still met. In one example, the system may require successful data transmissions for each node at least once every second. If 5 transmission attempts can occur once every 20 milliseconds, for example, then 50 failures can occur after approximately 200 milliseconds, allowing the wireless node to transition to the two-hop mode well before the 1 second limit.

Once the number of transmission failures for a respective node exceeds the threshold at step 504, the method 500 transitions to step 506 and the respective node enters the two-hop mode. This state may be controlled by a controller or processor (such as is included in the control and storage 306 of the wireless node 300), for example. The only node that needs to change operating state is the transmitting node. The other wireless nodes of the wireless network may be configured to listen for transmissions from other wireless nodes by default, as listening for other nodes does not interfere with transmissions in the normal operating state. Thus, when a wireless node transitions itself into the two-hop mode, the other wireless nodes are already listening for data, not requiring any change in configuration. Further, as the transmissions from the respective node to the other wireless nodes occur on a separate bandwidth allocation than the primary transmissions, the two types of transmissions do not cause collisions.

While operating in the two-hop mode, the wireless node may continue attempting to transmit data directly to the network managers over the direct communication links. Steps 508 and 510 check for successful and unsuccessful transmissions from the respective wireless node to other devices in the network, such as the network managers and other wireless nodes. At step 508, if the number of successful transmissions to the network managers exceeds a threshold, the wireless node transitions out of the two-hop state and back to the normal operating state, no longer sending data transmissions to the neighboring wireless nodes. This threshold may be any desirable number indicative of a re-established connection with the network manager such as, for example, 5 successful transmissions in a row. At step 510, if the number of failed transmissions from the respective node to either the network managers or other network nodes exceeds a threshold, the method 500 proceeds to step 512 and the failing network node takes action. This threshold may be any number for which it is desirable to exit the two-hop mode and take overall network action such as, for example, 200 failed transmissions. At step 512, the network node can take action, such as rejoining the network, providing an indication to one or more systems, or the like.

FIGS. 6A-6C are charts illustrating an example communication schedule in a network that employs a two-hop backup communication for wireless nodes. The transmission schedule may be a TSCH schedule, for example. The first row of the chart illustrates time for each pass through the schedule. FIG. 6A illustrates the first 40 ms of each 100 ms pass through the schedule, FIG. 6B illustrates the second 40 ms of each pass through the schedule, and FIG. 6C illustrates the final 20 ms of each pass through the schedule, such that a complete pass through the schedule consumes approximately 100 ms. The second row of the chart illustrates respective time slots for a TSCH schedule that includes 60 time slots. The third row illustrates which wireless node is scheduled to communicate with the first manager during the respective time slot. The fourth row illustrates which wireless node is scheduled to communicate with the second manager during the respective time slot. In the third and fourth rows, SE and SO indicate that the time slot is shared among even-numbered and odd-numbered nodes, respectively, and any such node is permitted to send data to the appropriate manager during this time slot. The fifth row illustrates which node attempts to retransmit data from a manager to a node operating in a two-hop state, and the sixth row illustrates to which node a node operating in a two-hop state attempts to transmit. In the example illustrated in FIGS. 6A-6C, the network includes 2 managers and 8 wireless nodes. Other examples can include any number of managers and any number of wireless nodes. As illustrated, the low bandwidth paths for the two-hop mode are low bandwidth in that the paths are only available during the first 40 ms of the 100 ms pass through the schedule, while the high bandwidth direct links with the managers are available for the entire 100 ms. As averaged over the entire 100 ms, there are more total links available to either manager than to any other node.

FIGS. 7A and 7B illustrate the first 40 ms of an example transmission schedule for a node that has entered a two-hop transmission mode. In this example, each pass through the schedule may still be 100 ms, as illustrated in FIGS. 6A-6C, but only the initial 40 ms are shown in FIGS. 7A and 7B. In the example illustrated in FIG. 7A, node 3 has entered the two-hop state. In slots 3 and 15, the node 3 attempts to transmit to the first manager over a high bandwidth direct link. In slot 4, the node 3 attempts to transmit to the node 1 over a low bandwidth link. In slot 5, the node 3 attempts to transmit to the node 2 over a low bandwidth link. In slot 7, the node 3 is scheduled to transmit to both the second manager and the node 4. The node 3 can select one of the two transmission options. In one example, the node 3 may select to transmit to the node 4 over a low bandwidth link as transmitting to a neighboring node during the two-hop state may have a greater likelihood of success. In slots 9, 11, and 22, the node 3 can attempt to transmit to the first manager as those respective slots are shared slots for odd-numbered nodes. In slots 10, 12, 21, and 23, the node 3 can attempt to transmit to the second manager as those respective slots are shared slots for odd-numbered nodes. In slot 16, the node 3 attempts to transmit to the node 5 using a low bandwidth link. In slot 17, the node 3 attempts to transmit to the node 6 using a low bandwidth link. In slot 18, the node 3 attempts to transmit to node 7 using a low bandwidth link. In slot 19, the node 3 is scheduled to transmit to both the second manager and the node 8. The node 3 can select one of the two transmission options. In one example, the node 3 may select to transmit to the node 8 as transmitting to a neighboring node while in the two-hop state may have a greater likelihood of success. Thus, the node 3 has 17 attempts to transmit data during the first 40 ms of the schedule.

When a wireless node successfully receives data from node 3, the wireless node can relay the data to the managers during a scheduled time slot. For example, if the node 2 successfully receives data from the node 3 during time slot 5, the node 2 can retransmit the data received from the node 3 during an upcoming scheduled transmission for the node 2. For example, the node 2 can attempt to retransmit the data to the second network manager during time slot 6. The transmission can include the data as well as an indication that the data is coming from the node 3. For example, each transmission in the wireless network may include a source field indicating the originator the data within the transmission. Thus, the node 2 can indicate that the data in the transmission is from the node 3, allowing the network manager to discern the origin of the data. This indication can be done without modifying or decrypting the original data.

FIG. 7B illustrates an example receive schedule for a node that is operating in the two-hop state. For the example illustrated in FIG. 7B, node 3 is operating in the two-hop state. In time slot 1, node 3 listens for transmissions from node 8 on the low bandwidth link. In slot 2, node 3 listens for transmissions from node 7 on the low bandwidth link. In slot 3, node 3 listens for transmissions from node 6 on the low bandwidth link. In slot 8, node 3 listens for transmissions from node 5 on the low bandwidth link. In slot 13, node 3 listens for transmissions from node 4 on the low bandwidth link. In slot 15, node 3 listens for transmissions from node 2 on the low bandwidth link, and in slot 20, node 3 listens for transmissions from node 1 on the low bandwidth link. The node 3 may receive the same data from multiple nodes in which case the node 3 can filter out duplicate messages. This may be accomplished by comparing the transmission received to a previously received transmission and if equivalent, discarding the newly received transmission.

The above provides more robustness against any single radio-frequency path failure within the wireless network by allowing any wireless node to failover into a state in which it attempts to route packets through all peers in the network. In systems such as battery monitoring systems in which the latency requirements are strict, there may be no time for network management decisions, so attempting to send data to all available devices is desirable to keep data flowing in an operating vehicle. All other wireless nodes continuously listen for any node that transitions into the two-hop failover state. By sharing the load between all devices in the network, handling failures can be accomplished with minimal power increase or disruption to data flow within the network.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of providing multiple modes of communication in wireless networks, the method comprising:
communicating data from a respective network node of a plurality of network nodes to a network manager using a respective communication link having a first bandwidth and according to first specified communication slots of a communication schedule for a wireless network, the plurality of network nodes and the network manager forming the wireless network;
transitioning to a two-hop mode of communication for the respective network node of the plurality of nodes, wherein other network nodes amongst the plurality of network nodes are configured to listen for communication from the respective network node; and
transmitting node data, during second specified communication slots of the communication schedule for the wireless network different than the first specified communication slots, from the respective network node to at least one of the other network nodes over a communication link having a second bandwidth different than the first bandwidth for retransmission of the node data to the network manager by the at least one of the other network nodes, wherein the first specified communication slots are designated for direct communication and the second specified communication slots are designated for two-hop communication.

2. The method of claim 1, wherein transitioning to the two-hop mode of communication for the respective network node comprises:
attempting to transmit the node data to the network manager from the respective network node over a direct communication link during the first specified communication slots of the communication schedule; and
determining that the node data was not transmitted successfully to the network manager from the respective network node using the direct communication link during the first specified communication slots.

3. The method of claim 2, wherein determining that the node data was not transmitted successfully to the network manager from the respective network node comprises determining that a count of failed attempts to transmit the node data to the network manager over the direct communication link exceeded a specified threshold.

4. The method of claim 1, further comprising:
attempting, while in the two-hop mode, to transmit the node data to the network manager over direct communication links between respective network nodes and the network manager during third specified timeslots of the communication schedule; and
transitioning out of the two-hop mode if the node data is received by the network manager successfully for a first specified count of attempts.

5. The method of claim 4, further comprising:
rejoining, by the network manager, the respective network node to the wireless network if the node data fails to reach the network manager or the other network nodes after a second specified count of attempts.

6. The method of claim 1, wherein the wireless network is a vehicle wireless battery monitoring system and wherein the network nodes are configured to measure one or more parameters of a battery of a vehicle, the method further comprising:
sensing, by the respecting network node, the one or more parameters of the battery, wherein the node data includes the one or more parameters.

7. The method of claim 1, wherein the communication schedule is a time synchronized channel hopping (TSCH) schedule, and wherein communicating the data from the plurality of network nodes to the network manager comprises communicating the data from the plurality of network nodes to the network manager during respective time slots of the TSCH schedule.

8. The method of claim 7, wherein transmitting the node data from the respective network node to the at least one of the plurality of network nodes comprises transmitting the node data to specified ones of the plurality of network nodes during specified time slots of the TSCH schedule.

9. A system for providing multiple modes of communication in wireless networks, the system comprising:
a network manager;
a plurality of network nodes forming a wireless network with the network manager, wherein the plurality of wireless nodes are configured to communicate data to the network manager using respective communication links having a first bandwidth and according to first specified communication slots of a communication schedule for a wireless network;
wherein the plurality of network nodes are further configured to transition to a two-hop mode of communication upon one or more failures in communication to the network manager; and
wherein while in the two-hop mode of communication, a respective network node of the plurality of nodes is configured to transmit node data, during second specified communication slots of the communication schedule for the wireless network different than the first specified communication slots, to at least one of other respective network nodes of the plurality of network nodes over a communication link having a second bandwidth different than the first bandwidth; and
wherein the first specified communication slots are designated for direct communication and the second specified communication slots are designated for two-hop communication; and
wherein the other respective network nodes are configured to listen for communication from the respective network node and re-transmit to the network manager the node data received from the respective network node.

10. The system of claim 9, wherein the respective network node is configured to attempt to transmit the node data to the network manager over a direct communication link and transition to the two-hop mode upon determining that the node data was not transmitted successfully to the network manager using the direct communication link.

11. The system of claim 10, wherein the respective network node is configured to determine that the node data was not transmitted successfully to the network manager using the direct communication link by determining that a count of failed attempts to transmit the node data to the network manager over the direct communication link has exceeded a specified threshold.

12. The system of claim 9, wherein the respective network node is further configured to attempt, while in the two-hop mode, to transmit the node data to the network manager over a direct communication link between the respective network node and the network manager, and transition out of the two-hop mode if the node data is received by the network manager successfully for a first specified count of attempts.

13. The system of claim 12, wherein the respective network node is configured to rejoin the wireless network if the node data fails to reach the network manager or the other respective network nodes after a second specified count of attempts.

14. The system of claim 9, further comprising a vehicle battery, wherein the wireless network is a vehicle wireless battery monitoring system and wherein the network nodes are configured to measure one or more parameters of the vehicle battery, and wherein the respective network node is configured to sense the one or more parameters of the battery, and wherein the node data includes the one or more parameters.

15. The system of claim 9, wherein the communication schedule is a time synchronized channel hopping (TSCH) schedule.

16. A system comprising:
means for communicating data from a plurality of network nodes to a network manager using respective communication links having a first bandwidth and according to first specified communication slots of a communication schedule for a wireless network, the plurality of network nodes and the network manager forming a wireless network;
means for transitioning to a two-hop mode of communication for a respective network node of the plurality of nodes, wherein other respective network nodes amongst the plurality of network nodes are configured to listen for communication from the respective network node;
means for transmitting node data, during second specified communication slots of the communication schedule for the wireless network different than the first specified communication slots, from the respective network node to at least one of the other network nodes over a communication link having a second bandwidth different than the first bandwidth, wherein the first specified communication slots are designated for direct communication and the second specified communication slots are designated for two-hop communication; and
means for re-transmitting to the network manager, by the at least one of the other network nodes, the node data received from the respective network node.

17. The system of claim 16, wherein the means for transitioning to the two-hop mode of communication for the respective network node comprises:
means for attempting to transmit the node data to the network manager from the respective network node over a direct communication link; and
means for determining that the node data was not transmitted successfully to the network manager from the respective network node using the direct communication link.

18. The system of claim 16, wherein the wireless network is a vehicle wireless battery monitoring system and wherein the network nodes comprise means for measuring one or more parameters of a vehicle battery, and wherein the respective network node comprises means for sensing the one or more parameters of the vehicle battery, and wherein the node data includes the one or more parameters.

* * * * *